Patented May 10, 1938

2,116,611

UNITED STATES PATENT OFFICE 2,116,611

POROUS MATERIAL AND METHOD OF MAKING SAME

Leon Pierre Georges Vautier, St. Just des Marais, and Claude Carnot, Paris, France, assignors to Societe Francaise de la Viscose, S. A., a corporation of France No Drawing. Application October 27, 1936, Serial No. 107,820. In Great Britain November 6, 1935

11 Claims. (Cl. 18—48)

This invention relates to porous cellulosic articles. More particularly it relates to artificial sponges.

In the manufacture of artificial sponges, a cellulose solution, such as viscose, is intimately mixed with fibrous materials and pore-forming substances, such as soluble crystalline materials, so as to obtain a pasty or plastic mass from which blocks are afterwards made by molding. The said blocks are coagulated in their mold and are then washed and suitably treated. It is also known to effect continuous molding by means of an extrusion press which forces the paste through a nozzle opening into a tube which is cold at the inlet but is suitably heated at the other end. In this tube, the mass is coagulated, at least superficially.

According to another process, the mass is molded under high pressure and is then removed from the mold and coagulated outside the mold. It is possible to employ a discontinuous molding apparatus, such as a brick press, or a continuous apparatus, such as an appropriate extrusion press. The blocks or the extruded bar may be cut up or sectioned before coagulation.

The products obtained according to these processes possess a certain orientation; that is to say, the resistance to mechanical stresses depends upon the direction of the stress. This phenomenon is due to an orientation of the material during molding, comparable, in its effect, to the grain of wood which is stronger along the grain than across the grain. By analogy we may speak of the "grain" of orientation. The orientation is very noticeable in the case of continuous molding by means of the extrusion press. The coagulated extruded bars are fairly strong in the direction of their length (along the "grain"), but break easily in the transverse direction (across the "grain"). The blocks obtained by the discontinuous molding process possess a less pronounced but still manifest orientation.

The present invention makes it possible to eliminate this orientation entirely and to produce artificial sponges which are equally strong in all directions.

The process according to the invention comprises molding under considerable pressure, for example, discontinuously by pressing blocks by the casting process or continuously by extrusion, a pasty mass having a basis of viscose, fibers and soluble crystals thereby producing an orientated structure, dividing the blocks or bars across the grain of orientation into sections and subjecting the sections to pronounced deformation by pressure in the same general direction as the grain of orientation, preferably perpendicularly to the cut surfaces, so as to disorientate the structure, and then coagulating the molded bodies.

The step of deforming by pressure gives rise to the desired disorientation of the material. The pressure may be applied by plates having plane or curved pressure surfaces. For example, in the case of sections cut from an extruded bar, pressure between two appropriately shaped plates may be exerted perpendicularly to the cut surfaces whereby an egg-shaped body is produced.

This invention renders it possible to produce sponges of all shapes; spherical, ovoid, and so forth, without loss of materials by waste during cutting up.

Preferably, the invention is applied in combination with the continuous molding process.

It is possible to employ any appropriate type of extrusion press, screw press, piston press, and so forth, provided, however, that the pressure is sufficient to impart a very compact texture to the mass. The pressure should preferably be of the order of 80 to 100 kilograms per square centimeter.

It is advantageous to constrict the extruded bar as it leaves the nozzle by means of a conical nose disposed in front of the said nozzle. The dimensions of this nose may vary considerably according to the diameter of the extruded bar, the consistency and composition of the paste, the temperature, and so forth. Its length is, for example, of the order of 2 to 10 centimeters, and its angle of aperture is, for example, 10° to 60°, giving rise to a constriction of 5% to 25%.

The deformation may also be obtained, for example, by means of a simple press comprising a two-part mold.

In order to more clearly explain the nature of the instant invention, the following illustrative example is given:

*Example*

20 parts of hemp are malaxated with 400 parts of viscose containing 10% of cellulose and 1200 parts of crystals of decahydrated sodium sulphate. The mixture is extruded in an appropriate apparatus, for example, of the "cakepress" type, having a nozzle 150 millimeters in diameter. A short conical nose, disposed in front of the nozzle, slightly constricts the extruded bar so that the diameter of the bar is about 125 millimeters. The thus extruded bar is cut into portions of appropriate length.

If the portions are coagulated directly, spongy blocks are obtained which have a resistance of 2 to 4 kilograms per square centimeter in the direction of their length, but only 0.8 to 1.6 kilograms per square centimeter in the transverse direction, and which moreover break in that direction along almost plane surfaces. However, by compressing these said portions in the longitudinal direction between two mold members mounted on the two plates of a press and then coagulating, spongy blocks are obtained, the ultimate breaking strength of which is practically identical in all directions and varies between 1.5 and 3 kilograms per square centimeter according to the conditions of manufacture. It should be noted that these dynamometer tests are always carried out in the wet state on test pieces of the usual form cut out of the block. It appears to be of little importance whether during deformation the mixture just fills the mold or whether there is excess of material. The principal point resides in the considerable deformation and profound disorientation resulting therefrom.

To facilitate removal from the mold, the portions may be enveloped in a piece of cloth which is removed after deformation and stripping the mold. The molds may be spherical, ovoid, and so forth. Polyhedric bodies may be incrusted in the small blocks during deformation.

Although crystallized decahydrated sodium sulphate has been disclosed as an illustrative pore-forming substance, it is to be understood that other crystalline or amorphous materials which melt or dissolve easily may be used in place thereof. Thus, paraffin, stearin, sugar and salts rich in water of crystallization may be used. In general, alkali metal salts containing water of crystallization and readily fusible are suitable, thus sodium acetate trihydrate, sodium carbonate decahydrate, trisodium phosphate dodecahydrate, disodium phosphate dodecahydrate, potassium sodium tartrate tetrahydrate, potassium fluoride dihydrate, and sodium thiosulfate pentahydrate.

While the sponges contemplated by this invention are in general produced by the coagulation of viscose, they may also be prepared by the coagulation of other esters, such as the nitrate or acetate or cellulose esters, such as ethyl or benzyl cellulose. The process of the present invention is, therefore, also applicable to these other cellulose derivatives.

Since it is obvious that various changes and modifications may be made in the above description without departing from the nature or spirit thereof, this invention is not restricted thereto except as set forth in the appended claims.

We claim:

1. A process for the manufacture of artificial sponges having substantially the same breaking strength in all directions thereof which comprises molding a pasty mass having a basis of a cellulose derivative, fibers and pore-forming material thereby producing an orientated structure, dividing the structure across the grain of orientation into sections, deforming the sections by applying pressure thereto in the same general direction as the grain of orientation to disorientate the sections, and coagulating the sections.

2. A process for the manufacture of artificial sponges having substantially the same breaking strength in all directions thereof which comprises extruding a pasty mass having a basis of a cellulose derivative, fibers and pore-forming material thereby producing an orientated structure, subjecting the extruded structure to a constriction of 5% to 25%, dividing the structure across the grain of orientation into sections, deforming the sections by applying pressure thereto in the same general direction as the grain of orientation to disorientate the sections, and coagulating the sections.

3. A process for the manufacture of artificial sponges having substantially the same breaking strength in all directions thereof which comprises molding a pasty mass having a basis of a cellulose derivative, fibers and pore-forming material thereby producing an orientated structure, dividing the structure across the grain of orientation into sections, enveloping the sections in a covering, deforming the sections by applying pressure thereto in the same general direction as the grain of orientation to disorientate the sections, and coagulating the sections.

4. A process for the manufacture of artificial sponges having substantially the same breaking strength in all directions thereof which comprises extruding a pasty mass having a basis of a cellulose derivative, fibers and pore-forming material thereby producing an orientated structure, subjecting the extruded structure to a constriction of 5% to 25%, dividing the structure across the grain of orientation into sections, enveloping the sections in a covering, deforming the sections by applying pressure thereto in the same general direction as the grain of orientation to disorientate the sections, and coagulating the sections.

5. A process for the manufacture of artificial sponges having substantially the same breaking strength in all directions thereof which comprises molding a pasty mass having a basis of viscose, fibers and soluble crystals thereby producing an orientated structure, dividing the structure across the grain of orientation into sections, deforming the sections by applying pressure thereto in the same general direction as the grain of orientation to disorientate the sections, and coagulating the sections.

6. A process for the manufacture of artificial sponges having substantially the same breaking strength in all directions thereof which comprises extruding a pasty mass having a basis of viscose, fibers and soluble crystals thereby producing an orientated structure, subjecting the extruded structure to a constriction of 5% to 25%, dividing the structure across the grain of orientation into sections, deforming the sections by applying pressure thereto in the same general direction as the grain of orientation to disorientate the sections, and coagulating the sections.

7. A process for the manufacture of artificial sponges having substantially the same breaking strength in all directions thereof which comprises molding a pasty mass having a basis of viscose, fibers and soluble crystals thereby producing an orientated structure, dividing the structure across the grain of orientation into sections, enveloping the sections in a covering, deforming the sections by applying pressure thereto in the same general direction as the grain of orientation to disorientate the sections, and coagulating the sections.

8. A process for the manufacture of artificial sponges having substantially the same breaking strength in all directions thereof which comprises extruding a pasty mass having a basis of viscose, fibers and soluble crystals thereby producing an orientated structure, subjecting the extruded structure to a constriction of 5% to 25%, dividing the structure across the grain of orientation into sections, enveloping the sections in a covering, deforming the sections by applying pressure thereto in the same general direction as the grain of orientation to disorientate the sections, and coagulating the sections.

9. An artificial sponge produced in accordance with the method set forth in claim 1 and having a breaking strength which is substantially the same in all directions.

10. An artificial sponge produced in accordance with the method set forth in claim 1 and having a breaking strength between 1.5 and 3.0 kilograms per square centimeter, said breaking strength being substantially the same in all directions.

11. An artificial sponge produced in accordance with the method set forth in claim 5 and comprising a shaped porous mass containing coagulated viscose and fibers and having a breaking strength between 1.5 and 3.0 kilograms per square centimeter, said breaking strength being substantially the same in all directions.

LEON PIERRE GEORGES VAUTIER.
CLAUDE CARNOT.

CERTIFICATE OF CORRECTION.

Patent No. 2,116,611.                    May 10, 1938.

LEON PIERRE GEORGES VAUTIER, ET AL.

It is hereby certified that error appears in the printed specification of the above numbered patent requiring correction as follows: Page 2, first column, line 48, for the word "esters" read ethers; and that the said Letters Patent should be read with this correction therein that the same may conform to the record of the case in the Patent Office.

Signed and sealed this 28th day of June, A. D. 1938.

(Seal)                                      Henry Van Arsdale,
Acting Commissioner of Patents.

ing, deforming the sections by applying pressure thereto in the same general direction as the grain of orientation to disorientate the sections, and coagulating the sections.

9. An artificial sponge produced in accordance with the method set forth in claim 1 and having a breaking strength which is substantially the same in all directions.

10. An artificial sponge produced in accordance with the method set forth in claim 1 and having a breaking strength between 1.5 and 3.0 kilograms per square centimeter, said breaking strength being substantially the same in all directions.

11. An artificial sponge produced in accordance with the method set forth in claim 5 and comprising a shaped porous mass containing coagulated viscose and fibers and having a breaking strength between 1.5 and 3.0 kilograms per square centimeter, said breaking strength being substantially the same in all directions.

LEON PIERRE GEORGES VAUTIER.
CLAUDE CARNOT.

CERTIFICATE OF CORRECTION.

Patent No. 2,116,611.                                   May 10, 1938.

LEON PIERRE GEORGES VAUTIER, ET AL.

It is hereby certified that error appears in the printed specification of the above numbered patent requiring correction as follows: Page 2, first column, line 48, for the word "esters" read ethers; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.

CERTIFICATE OF CORRECTION.

Patent No. 2,116,611. May 10, 1938.

LEON PIERRE GEORGES VAUTIER, ET AL.

It is hereby certified that error appears in the printed specification of the above numbered patent requiring correction as follows: Page 2, first column, line 48, for the word "esters" read ethers; and that the said Letters Patent should be read with this correction therein that the same may conform to the record of the case in the Patent Office.

Signed and sealed this 28th day of June, A. D. 1938.

(Seal)

Henry Van Arsdale,
Acting Commissioner of Patents.